(12) United States Patent
D'Arrigo et al.

(10) Patent No.: US 6,969,664 B2
(45) Date of Patent: Nov. 29, 2005

(54) MICRO SILICON FUEL CELL, METHOD OF FABRICATION AND SELF-POWERED SEMICONDUCTOR DEVICE INTEGRATING A MICRO FUEL CELL

(75) Inventors: Giuseppe D'Arrigo, Tremestieri Etneo (IT); Salvatore Coffa, Tremestieri Etneo (IT); Rosario Corrado Spinella, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 411 days.

(21) Appl. No.: 10/147,353

(22) Filed: May 16, 2002

(65) Prior Publication Data

US 2003/0003347 A1      Jan. 2, 2003

(30) Foreign Application Priority Data

May 17, 2001   (EP) .................................. 01830314

(51) Int. Cl.$^7$ .......................... H01L 21/76; H01M 4/86
(52) U.S. Cl. .......................... 438/424; 429/44; 429/41; 429/40
(58) Field of Search .................. 438/19, 424–426, 438/431; 429/40–41, 44

(56) References Cited

U.S. PATENT DOCUMENTS

| | | | |
|---|---|---|---|
| 5,316,869 A * | 5/1994 | Perry et al. ..................... | 429/19 |
| 6,506,513 B1 * | 1/2003 | Yonetsu et al. ................ | 429/34 |
| 6,541,149 B1 * | 4/2003 | Maynard et al. .............. | 429/40 |

(Continued)

FOREIGN PATENT DOCUMENTS

| | | | | |
|---|---|---|---|---|
| DE | 19757320 | 7/1999 | ........... | H01M 4/92 |
| DE | 19914681 | 10/2000 | ........... | H01M 8/02 |
| WO | 0045457 | 8/2000 | ........... | H01M 8/10 |
| WO | 0069007 | 11/2000 | ........... | H01M 4/86 |

OTHER PUBLICATIONS

Patent Abstracts of Japan, vol. 1995, No. 11, Dec. 26, 1995 & JP 07201348A Aug. 4, 1995.

Kelley et al., A Miniature Methanol/Air Polymer Electrolyte Fuel Cell, Electrochemical and Solid-State Letters, IEEE Service Center, Piscataway, NJ, vol. 3, No. 9, Sep. 2000, pp. 407-409.

Sim et al., Fabrication of Micro Power Source (MPS) Using a Micro Direct Methanol Fuel Cell (MicronDMFC) for the Medical Application, Technical Digest, Mems 2001, 14$^{th}$ IEEE International Conference on Micro Electro Mechanical Systems, Interlaken, CH, Jan. 21-25, 2001, pp. 341-344.

*Primary Examiner*—Jennifer Kennedy
(74) *Attorney, Agent, or Firm*—Lisa K. Jorgenson; Allen, Dyer, Doppelt, Milbrath & Gilchrist, P.A.

(57) ABSTRACT

A fuel cell for an electrical load circuit includes a first monocrystalline silicon substrate and a positive half-cell formed therein, and a second monocrystalline silicon substrate and a positive half-cell formed therein. Each half-cell includes a microporous catalytic electrode permeable to a gas and connectable to the electrical load circuit. A cell area is defined on a surface of each respective monocrystalline silicon substrate, and includes a plurality of parallel trenches formed therein for receiving the gas to be fed to the respective microporous catalytic electrode. A cation exchange membrane separates the two microporous catalytic electrodes. Each half-cell includes a passageway for feeding the respective gas to the corresponding microporous catalytic electrode.

28 Claims, 9 Drawing Sheets

U.S. PATENT DOCUMENTS

| | | | |
|---|---|---|---|
| 6,558,770 B1 * | 5/2003 | Lehmann et al. | 428/138 |
| 6,610,433 B1 * | 8/2003 | Herdeg et al. | 429/17 |
| 6,627,342 B1 * | 9/2003 | Nakamura et al. | 429/26 |
| 6,641,948 B1 * | 11/2003 | Ohlsen et al. | 429/44 |
| 6,740,444 B2 * | 5/2004 | Leban | 429/41 |
| 6,811,916 B2 * | 11/2004 | Mallari et al. | 429/36 |
| 2002/0020053 A1 * | 2/2002 | Fonash et al. | 29/623.1 |
| 2002/0041991 A1 * | 4/2002 | Chan et al. | 429/44 |
| 2003/0022052 A1 * | 1/2003 | Kearl | 429/34 |
| 2003/0044674 A1 * | 3/2003 | Mallari et al. | 429/44 |
| 2003/0096146 A1 * | 5/2003 | Foster | 429/30 |
| 2003/0134172 A1 * | 7/2003 | Grande et al. | 429/34 |

* cited by examiner

MICRO SILICON FUEL CELL, METHOD OF FABRICATION AND SELF-POWERED SEMICONDUCTOR DEVICE INTEGRATING A MICRO FUEL CELL

FIELD OF THE INVENTION

The present invention relates in general to primary fuel cells, and more particularly, to a fuel cell integrated in a semiconductor device.

BACKGROUND OF THE INVENTION

Fuel cells fed with a gaseous fuel for generating electricity are electrochemical devices. The gaseous fuel includes, for example, hydrogen and/or methanol and with oxygen or air. These electrochemical devices are known and have been developed over the last few decades. There is a large amount of literature on the different and peculiar technical aspects of these primary generators, such as, for example, the permionic cell separator, the catalytic electrodes, the cell structure, and the current collectors and distributors, for example.

Most commonly, the electrolyte is a polymeric film or membrane of an ion exchange resin, and typically a cation exchange resin often referred to as the proton exchange membrane (PEM). On the opposite faces of the proton exchange membrane are microporous catalytic electrodes permeable to the gaseous reagents, i.e., the fuel gas on one face and the oxygen or oxygen containing gas on the other face.

Cations or most typically protons ($H^+$) that are generated by ionization of hydrogen upon shedding electrons to the positive electrode at sites (triple phase points) at which are mutually in contact with the catalytic material of the electrode. This is in continuity with an electrical path with the negative electrode of the cell through the load circuit. The solid polymer electrolyte and the fuel, such as hydrogen, for example, is fed to the positive electrode of the cell. It migrates under the effect of the electric field through the proton exchange membrane and eventually reaches similar catalytic sites on the negative electrode of the cell disposed on the opposite phase of the membrane. Here the proton $H^+$ combines with oxygen to form water while absorbing electrons from the negative electrode.

It is well known that a fundamental requisite to achieve an acceptable rate (dynamics) of the electrodic anodic and cathodic (half-cell reactions) processes that take place on the opposite faces of the ion exchange membrane forming a solid polymer electrolyte of the cell is the high number of active sites available to support the respective half-cell reaction, in other words, their density per unit area of the cell. For this purpose, the catalytic electrodes are made of metallic structures permeable to gases and have a relatively high specific surface, besides being made of a chemically stable and catalytic metal.

Platinum and often platinum black, either supported or not on high specific surface particles of a chemically inert and electrically conductive material, such as carbon (carbon black), for example, is one of the catalytic electrode materials most often used, though other noble metals such as iridium, palladium, rhodium, ruthenium and alloys thereof may also be used.

Even the techniques used for forming the catalytic electrodes on the opposite faces of the ion exchange membrane must ensure an adequate porosity and permeability of the electrode structure by the respective liquid reagent and/or gas (fuel, oxygen or oxygen containing gas, mixture, water) in order to favor an effective mass transfer between the sites capable of supporting the electrodic reaction (half-cell reaction). In particular, the catalytic electrode forming the negative electrode of the fuel cell must also provide for an unhindered and immediate out flow of any excess water that may be formed as a product of the half-cell reaction.

To meet these basic requisites there have been numerous proposals and techniques for incorporating and/or adhering particles of catalytic electrode materials directly on the opposite faces of the membrane. This is done while ensuring an adequate porosity and permeability of the bonded electrode structure by the gaseous reagents and products, for example, by using as an adhesion binder polytetrafluoroethylene in the form submicrometric fibrous particles.

Another approach is to form suitable electrode structures by microetching. That is, forming electrodes in the form of thin metal films made microporous by a microetching step to be bonded or pressed on the opposite faces of the ion exchange membrane. U.S. Pat. No. 6,136,412 discloses a membrane-electrode assembly in which the electrode in contact with the membrane is formed by a non-structured porous electrically conducting element on which a catalytic metal (Pt) is deposited. The prior art documents cited in this patent provide a vast collection of publications representative of the state of the art of fuel cells.

In all instances, the requisites of microporosity, permeability and catalytic properties of the metal forming the electrode of the cell require the use of appropriate current collectors. These current collectors are capable of establishing electrical contact points that are densely and uniformly distributed over the rear surface. This is on the entire area of the electrode to provide for an adequate current conducting body that is easily connectable to the load circuit of the fuel cell.

In case of preformed catalytic electrodes in the form of thin microporous metal films, the current collectors may even fulfill the other fundamental function of providing for a mechanical support of the microporous catalytic electrode that typically is intrinsically fragile and difficult to handle.

Such an electrochemical device of electrical generation has the advantage of being free of corrosive liquid electrolytes, of toxic compounds and/or pollutants. It also has a very high power/weight ratio, and an autonomy of operation that may be adapted to need (reservoir of usable fuel). The electrochemical device is also simple to form. This makes it particularly suited to power portable instruments and devices, and more particularly, systems that may be entirely integrated monolithically on silicon. These systems include, for example, mobile radios, monitoring instruments, portable computers, signaling devices, radio beacons and the likes. Another important area of application is related to gas sensors that are integrated together with associated monitoring, testing and signaling circuitry formed on silicon.

With such a growing demand for fuel cells having a reduced size for powering portable electronic instruments and apparatuses, the possibility of forming a fuel cell of a very small or minuscule size directly on silicon becomes very relevant. Such a fuel cell could even be integrated (at least a half-cell) on the same chip on which the functional circuitry to be powered by the micro fuel cell is integrated. Even in the area of biochemical process research, micro fuel cells integrated on silicon may be very useful.

SUMMARY OF THE INVENTION

An object of the present invention is to provide a fuel cell having a very small size formed on silicon.

Another object of the present invention is to provide a micro fuel cell that can be at least partly integrated on a silicon chip containing an integrated circuit to be powered by the micro fuel cell.

A further object of the present invention is to provide a method of fabricating a fuel cell on silicon.

According to a first aspect of the present invention, each half-cell includes a microporous catalytic electrode permeable to a gaseous fuel or to an oxygen containing gas, and is electrically connectable through the component parts of the half-cell to an electrical load circuit. This is formed on a conducting monocrystalline silicon substrate on which a plurality of parallel trenches are cut in a defined cell area on a face of the substrate. This provides channels for feeding or exhausting the respective gaseous fluid to or from the microporous catalytic electrode of the half-cell.

The microporous catalytic electrode that is permeable to gases is formed by a plurality of coplanar and parallel strips of a catalytic metallic material electroplated or sputtered over a heterogeneous column of monocrystalline silicon. The structure is purposely formed by etching the silicon substrate to form the plurality of parallel trenches for ducting reagents and products of the electrode reactions to and from the microporous catalytic electrode formed thereon.

The spaced parallel strips forming the microporous catalytic electrode that is permeable to gases are electrically connected one to the other by parallel strips of conducting material that alternately placed with respect to the microporous strips of catalytic electrode material. The entire composite electrode structure of the half-cell is in electrical contact with the conducting substrate of monocrystalline silicon with respect to the strips of conducting material deposited over the crests or peaks of separation between adjacent parallel trenches etched in the silicon substrate. It is also optionally with respect to the heterogeneous column of conducting monocrystalline silicon in case it is not completely removed by an eventual chemical and/or electrochemical final etching step. This is after having deposited thereon the catalytic metal to form a self-sustaining microporous structure.

Two half-cells thus formed on distinct silicon substrates are thereafter placed one against the other. The half-cells sandwich, at least over the cell area, a thin film of permionic membrane that is substantially impermeable to fluids. It is evident how a half-cell of the invention may be formed in a dedicated area of the surface of a silicon chip on which a load circuitry of the fuel cell is integrated.

The other half-cell, made in a completely similar manner on a distinct silicon substrate may thereafter be operatively assembled over the monolithically integrated half-cell of the first chip of silicon containing the load circuitry to be powered by the fuel cell. This is done by sandwiching therebetween over the cell area a permionic membrane, and permanently assembling the fuel cell by gluing and/or using an appropriate clamp.

Alternately, the permionic membrane separator of the fuel cell may be formed by depositing a film of fluid ion exchange resin. This may be done, for example, by a spinning technique similar to the one used for applying a film of resist on the surface of a silicon wafer, and thereafter causing a complete polymerization of the resin.

Another suitable method of depositing a fluorocarbon polymer having fixed sulphonic acid groups is disclosed in U.S. Pat. No. 4,661,411. A gas feeding conduit permits fuel gas to be provided to the porous catalytic electrode of one of the half-cells, while another conduit ensures an appropriate circulation of air or the feeding of oxygen to the counter electrode of the micro fuel cell thus formed on silicon. It also ensures the exhausting of any excess water that eventually forms at the negative electrode of the cell.

According to another aspect of the invention, a process for fabricating a half-cell of a fuel cell on a conducting monocrystalline silicon substrate compatible with the processing step normally required for fabricating integrated semiconductor devices is also provided.

BRIEF DESCRIPTION OF THE DRAWINGS

The different aspects and advantages of this invention will become even more evident through the following description of several embodiments and by referring to the attached drawings, wherein.

DETAILED DESCRIPTION OF THE PREFERRED EMBODIMENTS

Figure 1:
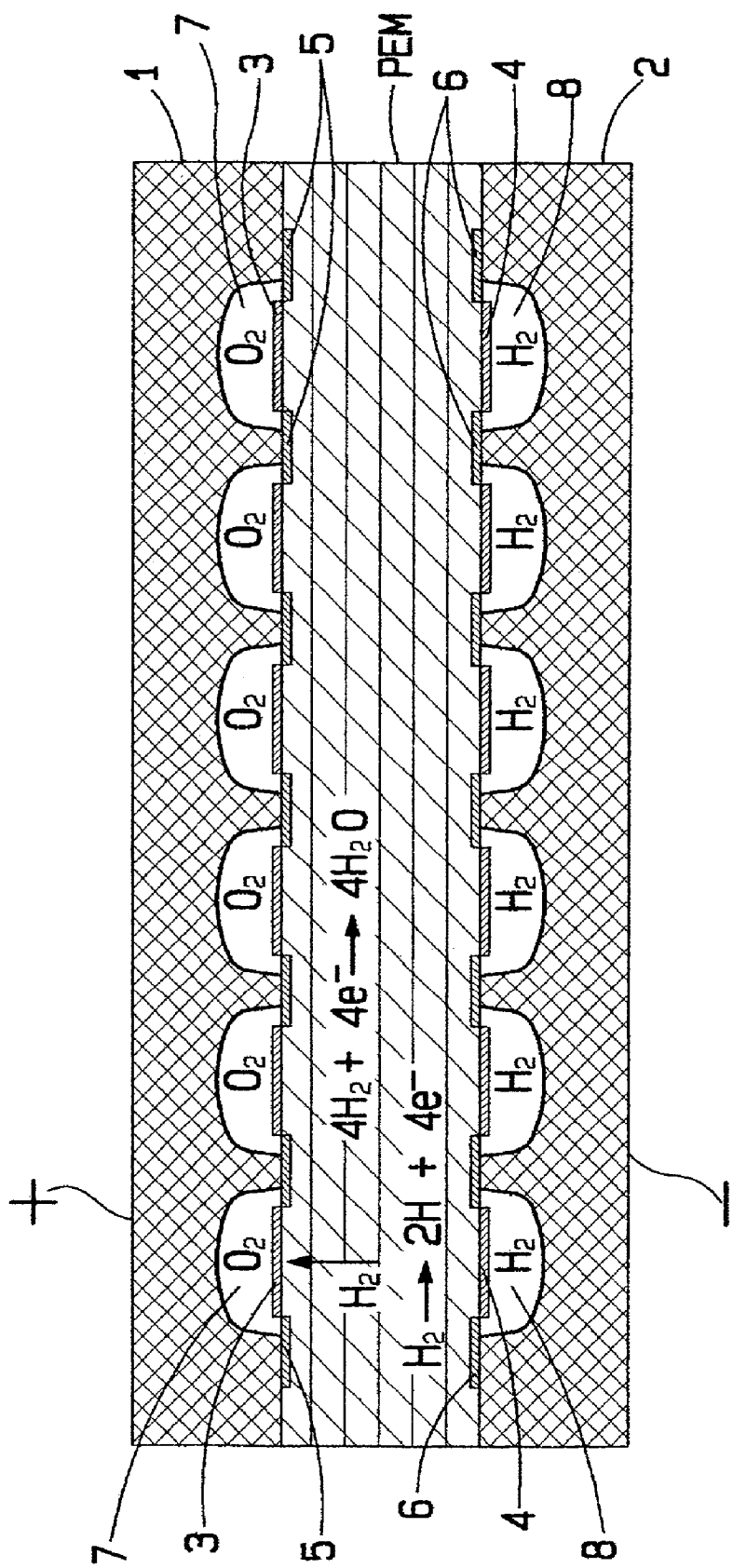
FIG. 1 is a schematic cross section of a micro fuel cell made on a monocrystalline silicon substrate according to the present invention.

The structure of the fuel cell of the invention is reproduced schematically in FIG. 1. The cell is composed of two half-cells, positive (+) and negative (−), respectively having a substantially similar structure, hydraulically separated by a membrane of a cation exchange polymeric material PEM.

The current collector body of the positive half-cell 1, as well as of the negative half-cell 2, is doped monocrystalline silicon having an electrical conductivity generally equal to or less than 1 ohm/cm. The silicon on which the two half-cells are formed may be of the $n^+$ type or of the $p^+$ type, and has a dopant concentration equal to or greater than $10^{17}$ atoms/cm$^3$. Preferably, the silicon forming the two half-cells is $p^+$ type silicon, doped with boron, and has a concentration that is generally between $10^{17}$ and $10^{19}$ atoms/cm$^3$.

The gas permeable microporous catalytic electrode of each half-cell, respectively 3 and 4, is composed of a plurality of coplanar parallel strips of a porous catalytic metallic material. These strips are mechanically and electrically connected to one another by strips of a nonporous metal, respectively 5 and 6, alternately disposed with respect to the microporous catalytic strips 3 and 4. The strips 5 and 6 are in electrical continuity with the conducting silicon substrate corresponding to the separation of the parallel channels for the feeding of gaseous reagents, respectively 7 and 8. The parallel channels 7 and 8 are created in the silicon substrate by electrochemical and/or chemical etching, and correspond to the coplanar parallel strips 3 and 4 forming the microporous catalytic electrode.

The nonporous metal strips 5 and 6 providing the electrical connection are also used as a mask for the etching the silicon substrate for forming the gas passage channels 7 and 8, as will be described in more detail below. The strips 5 and 6 are preformed in defined areas of separation of the parallel spaced apart microporous strips 3 and 4. They also establish the electrical continuity of the various portions of microporous catalytic electrode, and between the latter and the doped silicon substrate acting as a current collector or distributor of the respective catalytic electrode.

Each half-cell thus formed is a self-standing assembly that may be coupled directly on the face of an ion exchange membrane or film PEM. The coupling may be established in a permanent fashion by pressing the two half-cells, which are suitably aligned, over the opposite surfaces of the PEM membrane. The coupling is maintained by gluing and/or by clamping according to generally known techniques.

The substrate may be a silicon wafer of type Cz (100), doped either $p^+$ or $n^+$. According to a preferred method of fabrication of a half-cell, a $p^+$ type monocrystalline silicon substrate doped with boron with a concentration between $10^{18}$ and $10^{19}$ and having an electrical conductivity below 1 ohm/cm is used. Of course, a suitably doped substrate, preferably of type $p^+$, may even be obtained by epitaxial growth or by implant and diffusion in a monocrystalline silicon wafer having different characteristics according to generally known fabrication techniques.

The main steps of the fabrication process are depicted in FIGS. 2 to 8 for one of the two structurally similar half-cells 1 and 2. A first step, depicted in FIG. 3 includes depositing a thin film or germ layer 5' of a metal chosen from the group composed of gold, platinum, palladium, iridium, rhodium, ruthenium and alloys containing at least one of these metals. This layer has a thickness generally between 20 and 60 nm on the surface of the silicon substrate. Preferably, the thin germ film is formed by sputtered gold.

The process includes a first masking step using resist M1 for defining the metals to be electrodeposited over the germ player 5'. The metals will serve as a mechanical support and as electrical connections for the portions of, or more preferably, for the parallel strips of porous catalytic metal that form the electrode of the half-cell.

Figure 3:
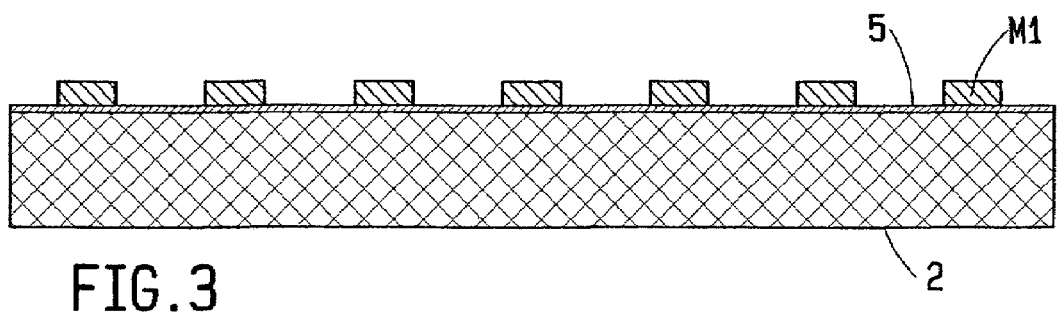
Figure 4:
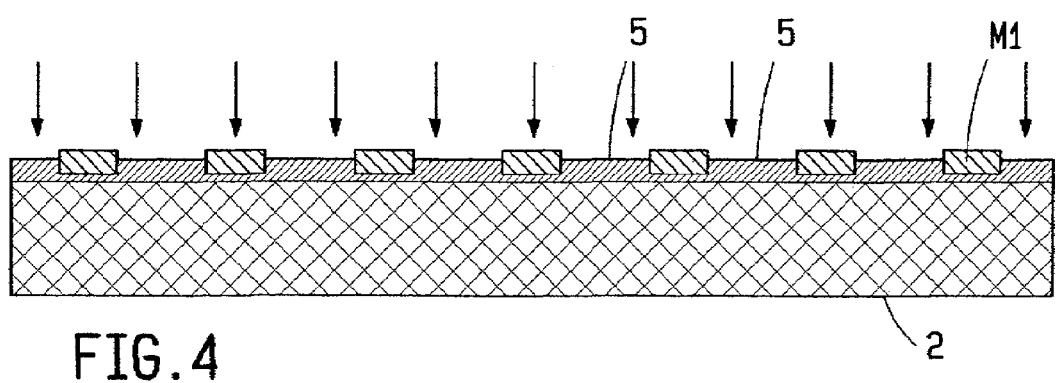

As shown in FIGS. 3 and 4, a metal from the group of metals specified above is galvanically deposited through the mask M1. The germ layer 5' is used as an initial cathode. The electroplated metals 5 may have a thickness generally between 5 and 30 $\mu$m.

Figure 5:
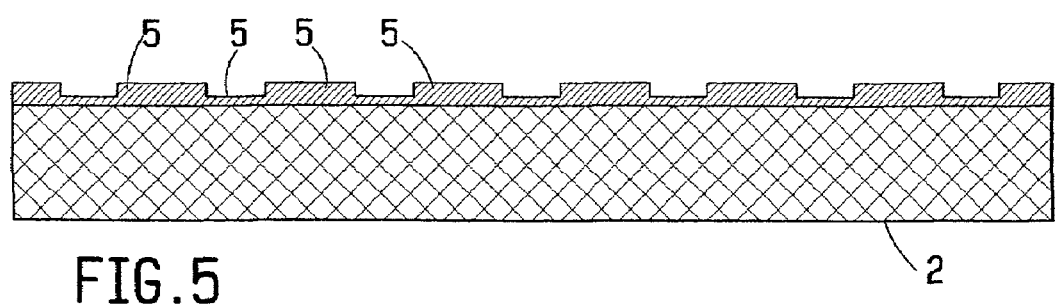
Figure 6:
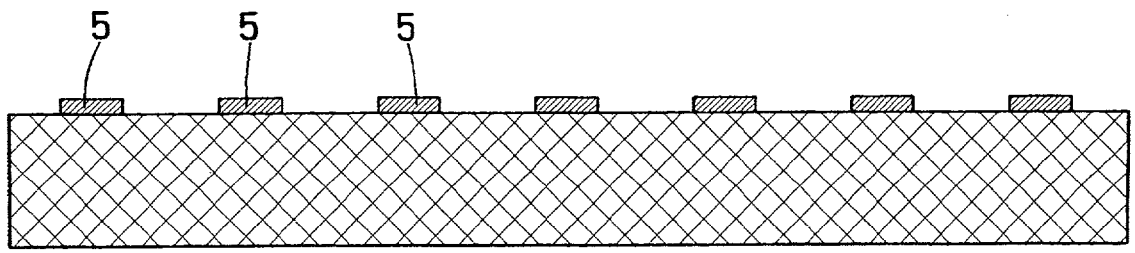

After the resist mask M1 has been removed, as shown in FIG. 5, such as by an anodic dissolution or by a selective etching of the metal of the germ layer 5', the latter is completely removed from the previously masked areas under the resist mask M1. At this point of the fabrication process, the structure is as schematically shown in FIG. 6.

By exploiting the metals 5 as a mask, the doped silicon substrate is subjected to an electroerosion treatment by polarizing the silicon substrate as an anode of an electrolytic cell containing an aqueous solution of hydrofluoric acid at 12% by volume, using as a counterelectrode (cathode) a gold electrode. Other metals may be used in consideration of the fact that the cathodic polarization, if not interrupted, effectively protects the metal from chemical attack by the acid electrolyte.

Figure 9:
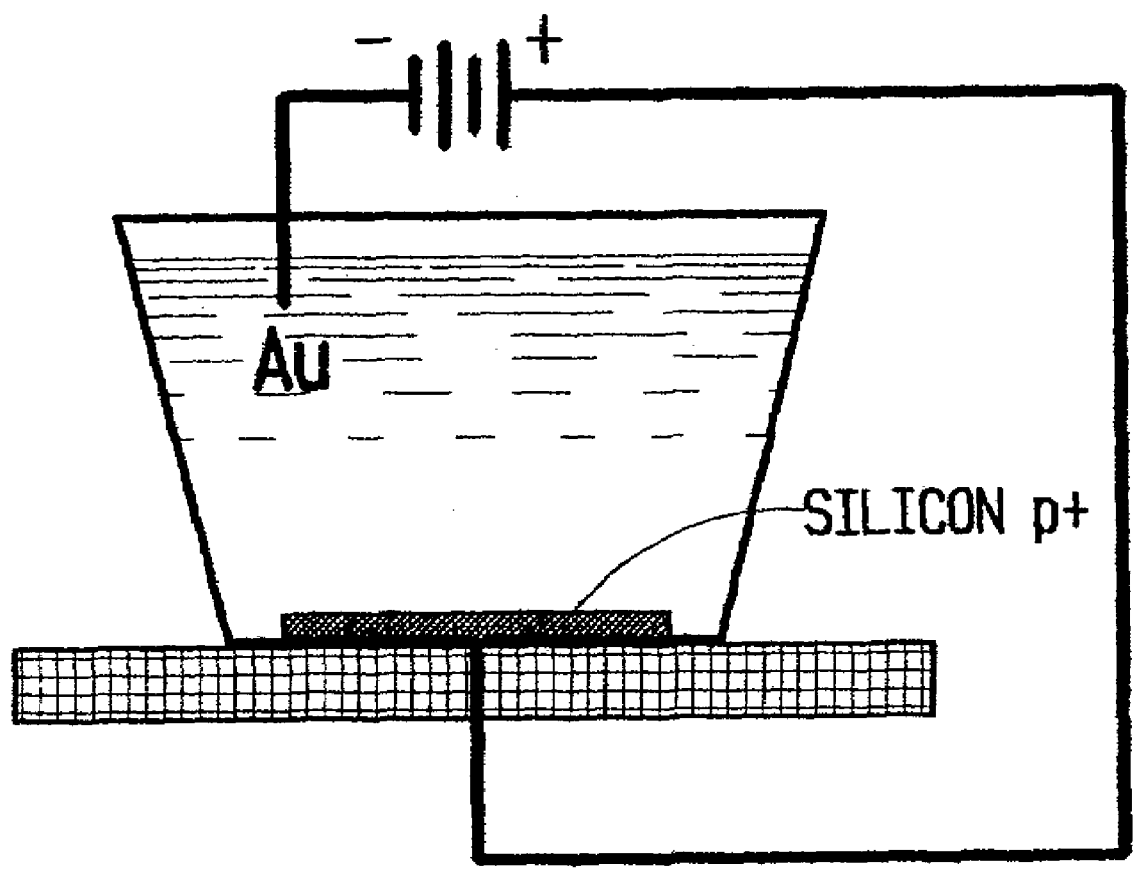
FIG. 9 is illustrates equipment for electrochemically etching a $p^+$ or $n^+$ silicon substrate to form a heterogeneous column of crystalline silicon according to the present invention.

The scheme of electroerosion treatment of the silicon substrate is depicted in FIG. 9. The electroerosion process proceeds according to the following reactions:

$$Si + 2H_2O + 4e^- = SiO_2 + 4H^+$$

$$SiO_2 + 6HF = SiF_6^{2-} + 2H_2O + 2H^+ \text{ (at the Si anode)}$$

$$4H^+ + 4e^- = 2H_2 \text{ (at the Au cathode)}$$

The anodic reaction consumes vacancies provided by the external current generator to the silicon causing an oxidation of silicon. The electrochemical anodic reaction of the oxidation of silicon associates a continuous chemical dissolution of the silicon oxide as soon as it forms on the surface of the solid silicon by the fluoride ions present on the solution.

Figure 10:
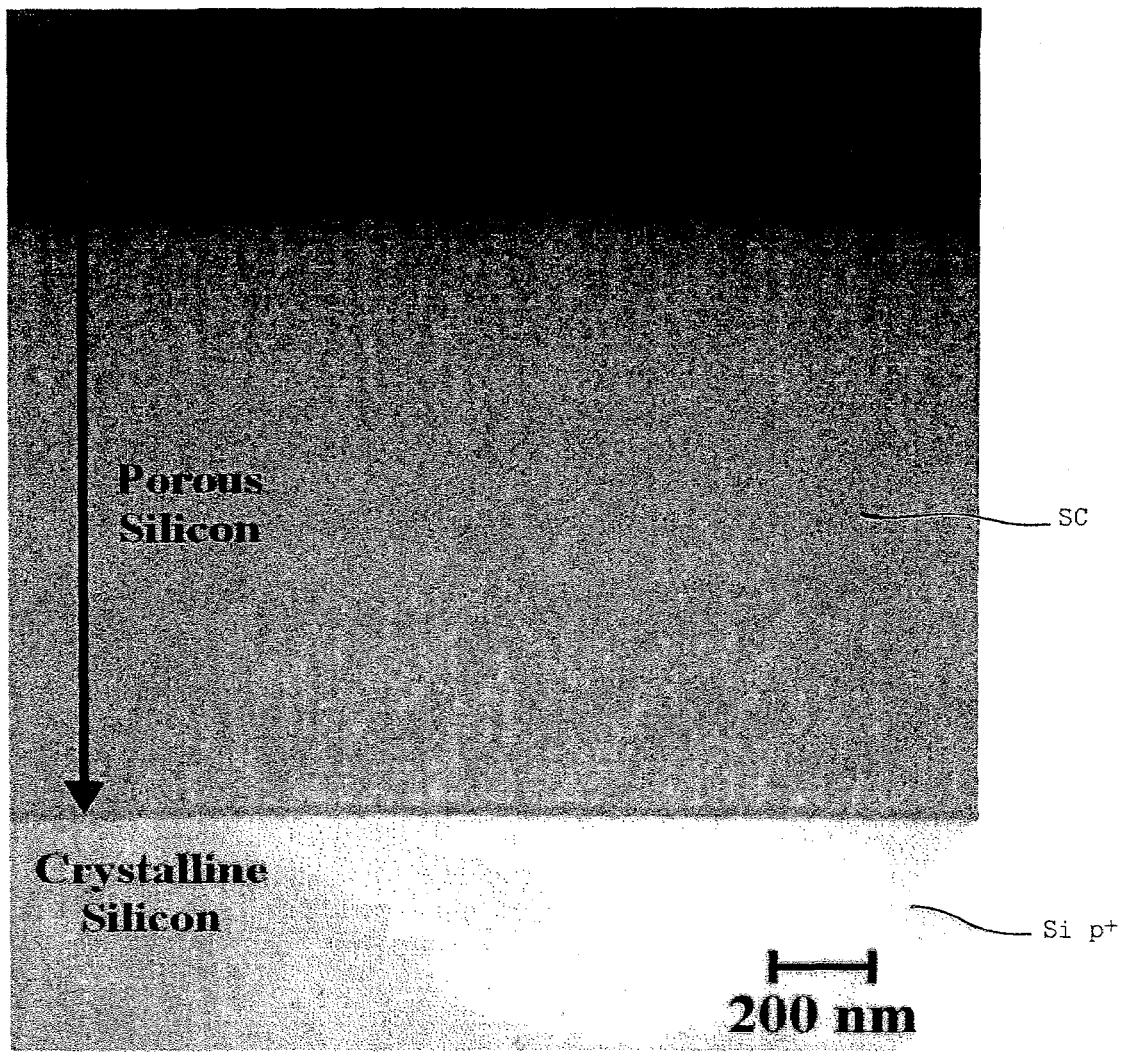
FIG. 10 is a TEM microphotograph showing the nature of the column of the residual silicon that forms in the etching zones according to the present invention.

In the case of a doped silicon substrate, for example, in a $p^+$ silicon substrate, progress of the two reactions determines a differentiated erosion of the crystal leading to the formation of a heterogeneous column of crystalline silicon SC characterized by pores of low tortuosity, as may be observed from the TEM microphotograph of FIG. 10.

The porosity of the DC produced by the electrochemical erosion depends on the current density that is forced through the electrolytic cell, from the type of electrolyte used and from the type of the monocrystalline doped silicon substrate. The dependence of porosity from the current density in the example illustrated is reported in the diagram of FIG. 11.

The electroerosion process is conducted until such a heterogeneous column of crystalline silicon SC with a substantially constant porosity for a depth that may be established according to need is formed. The depth of the highly porous channels thus formed may be generally between 5 and 60 $\mu$m, or even greater.

Figure 7:
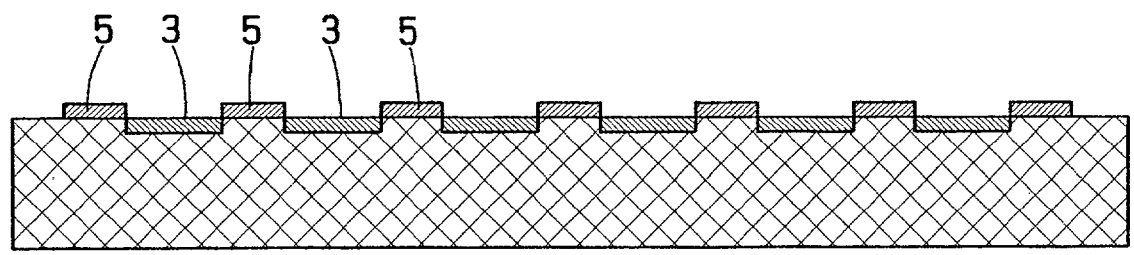

On the formed highly porous column structure, as schematically depicted in FIG. 7, a catalytic metal is chosen. The metal may be chosen from among platinum, palladium, iridium, ruthenium, rhodium and alloys of at least one of the metals. However, platinum is preferably chosen. The metal may be electroplated from an acid solution of a reducible salt of the catalytic metal, such as a chloroplatinic solution, for example. Alternately, metal may be deposited by sputtering. The deposition of the catalytic metal may be conducted over the entire area of the half-cell after having masked the preformed metallic strips (metals) 5 that provide electrical interconnections.

The catalytic metal may tend to deposit at the start from the bottom of the pores of the SC structure, because the column is a material having a relatively higher resistivity than the bulk of the doped silicon crystal. The catalytic metal may be deposited on the porous structure until filling it almost completely, thus creating a structure 3 that in some measure is geometrically complementary to the column of crystalline silicon SC, and which bonds itself mechanically and electrically to the unmasked edges of the preformed nonporous metal strips 5.

According to a first embodiment of the method of the invention, the heterogeneous column of crystalline SC of eroded silicon may thereafter be completely removed by selectively etching the doped silicon of the SC column using a moderately basic aqueous solution, for example, of KOH at 3% by weight, or even tetramethilammonium hydroxide (TMAH). It may even be formed by electrochemical etching using the same solution of hydrofluoric acid used for forming the heterogeneous column of crystalline silicon SC.

The second etching step, beside demolishing and removing the column structure, determines an etching with marked isotropic characteristics of the silicon substrate. This creates channels through which feeding and exhausting gases flow. The channels have an appropriate cross section directly underneath the microporous strips 3 of the catalytic metal which, freed of the silicon column that acted as a deposition support during their formation, remains electrically and mechanically connected to adjacent metals. That is, they are connected to the nonporous metal strips 5 as schematically depicted in the cross section view of FIG. 8.

Figure 12:
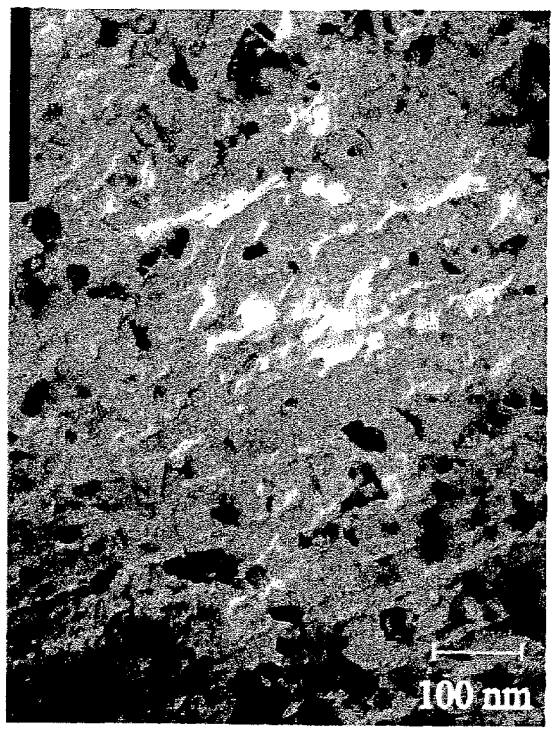
FIGS. 12 and 13 are respectively a TEM microphotograph and a diffraction pattern of the microporous electrode structure obtained by electroplating platinum from an aqueous sulfate solution acidified with sulfuric acid on the crystalline silicon column structure of FIG. 10.
Figure 13:
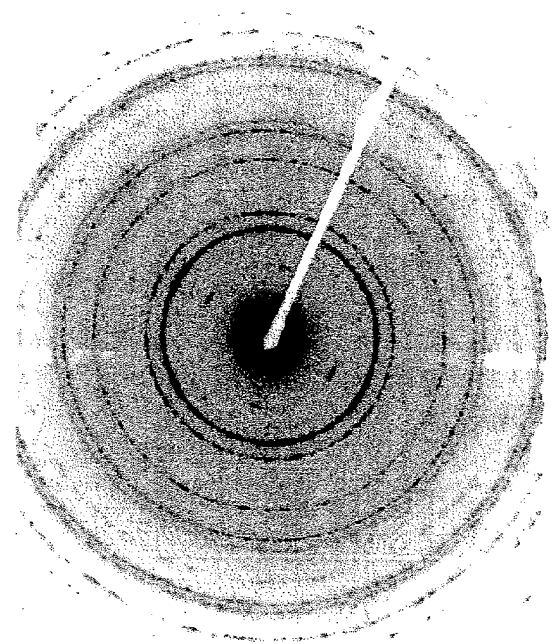
Figure 14:
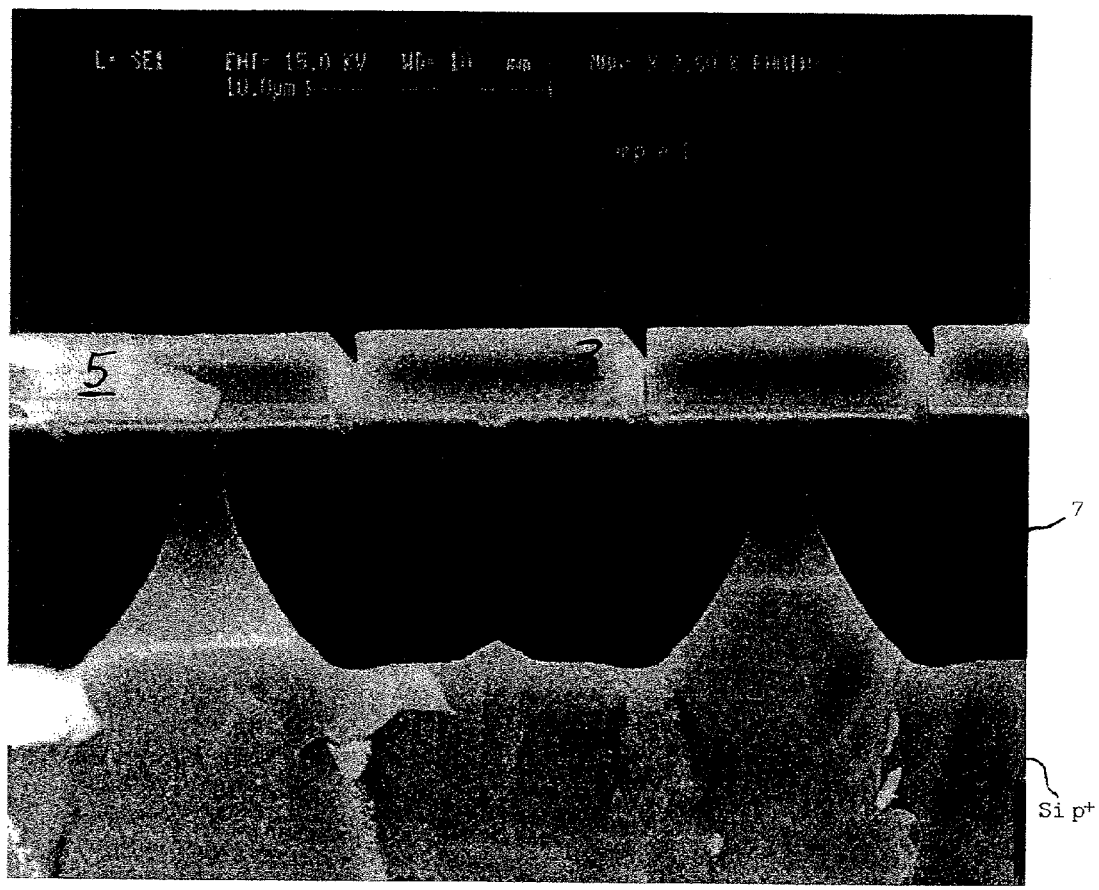
FIG. 14 is a SEM microphotograph of the cross section of an integrated half-cell according to the present invention.

FIGS. 12, 13 and 14 are PEM microphotographs of the catalytic microporous structure produced by galvanic deposition of the metal. The diffraction picture shows the superimposition of the spots relative to the column of eroded silicon, and spots relative to the polycrystalline structure of the deposited metal. There is also a SEM microphotograph of the half-cell structure integrated on silicon, which corresponds to the structure schematically shown in FIG. 8.

According to an alternate embodiment, the heterogeneous column of eroded doped monocrystalline silicon that is formed for supporting the formation by galvanic deposition or by sputtering of the microporous layer of catalytic metal forming the electrode of the half-cell, may not even be completely removed with a subsequent selective etching of silicon. Instead, it may be retained, at least partially (for example, by interrupting the etching step) in order that the residual column continues to provide a mechanical support to the portion of a microporous catalytic electrode formed thereon. This also acts as a current collector or distributor from the catalytic electrode toward the conducting doped silicon substrate or vice-versa. Of course, the silicon substrate is readily connectable to a load circuit of the fuel cell. The load circuit of the fuel cell may even be integrated in a dedicated area on the same silicon substrate on which one of the two half-cells is formed.

Figure 15:
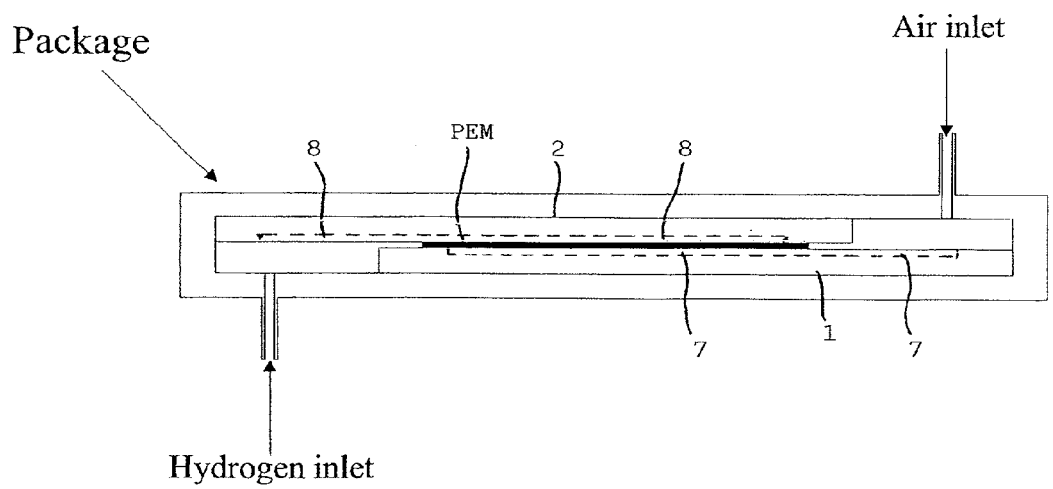

FIG. 15 is a schematic view of a cross section of the micro fuel cell formed on silicon. A possible pattern of the gas channels 7 and 8 of the respective positive and negative half-cells is shown in the exploded view of FIG. 16.

The two silicon dies 1 and 2, eventually assembled inside a package, clamp the ion exchange membrane (PEM) disposed on the cell area so as to separate the respective gaseous reagents and products of the electrodic reactions circulating in the respective channels 7 and 8 at the back of the microporous electrodic strips. Several of the interconnected channels 7 of the positive half-cell 1 extend beyond the edge of the PEM membrane and communicate with a ventilation chamber opened to the outer atmosphere. Several of the interconnected channels 8 of the negative half-cell extend beyond the opposite edge of the PEM membrane and communicate with an inlet chamber of the fuel gas, such as hydrogen, for example.

Under conditions of a closed load circuit of the primary cell, it is sufficient to maintain a hydrogen atmosphere in the feed or inlet chamber. This is done, for example, by connecting a fuel inlet port of the packaged device to a source of hydrogen. For a portable instrument, it may simply be a liquid hydrogen bottle provided with a delivery pressure reducer, and ensures a sufficient ventilation of the chamber communicating with the outside area. The ventilation of the chamber communicating with the channels 7 of the positive half-cell is sufficient to provide the oxygen that is consumed at the positive electrode of the micro fuel cell, as well as to release in the atmosphere any excess water vapor that may be generated at the positive electrode of the cell. Water vapor may be added to the combustion air or oxygen mixture and to the gaseous fuel. Water vapor may be added in case a possible dehydration of the membrane needs to be prevented. The silicon micro fuel cell of the invention, fed with hydrogen and air is capable of providing a DC voltage of about 0.8 V at a current density of about 200 mA/cm$^2$ of active cell area.

That which is claimed is:

1. A fuel cell comprising:
a first monocrystalline doped silicon substrate having a positive half-cell formed in a cell area defined on a surface thereof, said positive half-cell comprising parallel microporous strips of a positive catalytic electrode material, permeable to a fuel gas, connectable to an electrical load circuit of the fuel cell, and a plurality of parallel trenches formed under said parallel microporous strips of a positive catalytic electrode material for the passage of the fuel gas fed thereto;
a second monocrystalline doped silicon substrate having a negative half-cell formed in a cell area defined on a surface thereof, said negative half-cell comprising parallel microporous strips of a negative catalytic electrode material, permeable to an oxygen containing gas, connectable to the electrical load circuit of the fuel cell, and a plurality of parallel trenches formed under said microporous strips of a negative catalytic electrode material for the passage of the oxygen containing gas fed thereto;
a cation exchange membrane interposed over the defined cell areas between said positive and negative half-cells for hydraulically separating them and contacting said parallel microporous strips of positive and negative catalytic electrode material;
means for supplying the fuel gas to said parallel microporous strips of a positive catalytic electrode material;
means for supplying the oxygen containing gas to said parallel microporous strips of a negative catalytic electrode material and for exhausting the products of the electrode reaction; and
each of said parallel microporous positive and negative strips of catalytic electrode material being respectively alternated with parallel current distributing strips and current collecting strips of solid metal, the parallel microporous positive and negative catalytic electrode material being deposited in a heterogeneous columnar crystalline skeleton residue in the trenches and at least partly filling them to define a microporous geometrically complementary structure of the supporting heterogeneous columnar crystalline skeleton residue.

2. A fuel cell according to claim 1, wherein said respective supporting heterogeneous columnar crystalline skeleton residue in the trenches is at least partly etched away leaving said parallel microporous strips of a positive and negative catalytic electrode material overhanging their respective trenches and being mechanically and electrically connected to adjacent parallel current distributing and current collecting strips of solid material.

3. A fuel cell according to claim 2, wherein said strips of solid metal are in electrical contact with the respective monocrystalline silicon substrate along separation peaks of adjacent parallel trenches.

4. A fuel cell according to claim 2, wherein said strips of solid metal comprises at least one of gold, platinum, iridium, rhodium and alloys of at least one thereof.

5. A fuel cell according to claim 2, wherein said plurality of porous metal strips comprises at least one of platinum, palladium, iridium, rhodium, ruthenium and alloys thereof.

6. A fuel cell according to claim 1, wherein said porous heterogeneous columnar crystalline skeleton residue comprises at least one of a p+ and n+ doping.

7. A fuel cell comprising:
a first monocrystalline substrate comprising a positive half-cell formed in a cell area defined on a surface thereof, said positive half-cell comprising parallel microporous strips of a positive electrode material, and a plurality of parallel trenches formed under said parallel microporous strips of a positive electrode material for the passage of a first gas fed thereto;
a second monocrystalline substrate comprising a negative half-cell formed in a cell area defined on a surface thereof, said negative half-cell comprising parallel microporous strips of a negative electrode material, and a a plurality of parallel trenches formed under said microporous strips of a negative electrode material for the passage of a second gas fed thereto;
an exchange membrane interposed over the defined cell areas between said positive and negative half-cells for hydraulically separating them and contacting said parallel microporous strips of positive and negative electrode material;
a first passageway for feeding the first gas to said parallel microporous strips of a positive electrode material;
a second passageway for feeding the second gas to said parallel microporous strips of a negative electrode material and for exhausting products of a reaction between said positive and negative electrode materials; and
each of said parallel microporous positive and negative strips of electrode material being respectively alternated with parallel current distributing strips and current collecting strips of solid metal, the parallel positive and negative electrode material being deposited in a heterogeneous columnar crystalline skeleton residue in the trenches and at least partly filling them to define a microporous geometrically complementary structure of the supporting heterogeneous columnar crystalline skeleton residue.

8. A fuel cell according to claim 7, wherein said positive electrode material comprises a microporous catalytic electrode that is permeable to the first gas; and wherein said negative electrode material comprises a microporous catalytic electrode that is permeable to the second gas and to the products of the reaction between said positive and negative electrode material.

9. A fuel cell according to claim 7, wherein the first gas comprises a fuel gas; and wherein the second gas comprises oxygen.

10. A fuel cell according to claim 7, wherein said exchange membrane comprises a cation exchange membrane.

11. A fuel cell according to claim 7, wherein each electrode material comprises a plurality of coplanar and parallel porous metal strips, each porous metal strip being formed above a trench in said cell area and being electrically connected to at least one adjacent solid metal strip.

12. A fuel cell according to claim 11, wherein said strips of solid metal are formed alternately between said porous metal strips for electrically connecting the plurality of porous metal strips to a respective monocrystalline silicon substrate.

13. A fuel cell according to claim 11, wherein said strips of solid metal comprises at least one of gold, platinum, iridium, rhodium and alloys of at least one thereof.

14. A fuel cell according to claim 11, wherein said plurality of porous metal strips of solid metal comprises at least one of platinum, palladium, iridium, rhodium, ruthenium and alloys thereof.

15. A fuel cell according to claim 7, wherein said porous heterogeneous columnar crystalline skeleton residue comprises at least one of a p+ and n+ doping.

16. An integrated semiconductor device comprising:
a first substrate comprising:
an electrical load circuit formed on said first substrate, and
a positive half-cell formed in a cell area defined on a surface of said first substrate and comprising parallel microporous strips of a positive electrode material connected to said electrical load circuit, and a plurality of trenches formed said parallel microporous strips of a positive electrode material for the passage of a first gas fed thereto;
a second substrate comprising a negative half-cell formed in a cell area defined on a surface of and comprising parallel microporous strips of a negative electrode material connected to said electrical load circuit, and a a plurality of trenches formed trenches formed under said microporous strips of a negative electrode material for the passage of a second gas fed thereto;
an exchange membrane interposed over the defined cell areas between said positive and negative half-cells for hydraulically separating them and contacting said parallel microporous strips of positive and negative electrode material;
a first reservoir for providing the first gas to said microporous strips of a positive electrode material;
a second reservoir for providing the second gas to said microporous strips of a negative electrode material and for removing products of a reaction between said first and second electrode materials; and
each of said microporous positive and negative strips of electrode material being respectively alternated with current distributing strips and current collecting strips of solid metal, the positive and negative electrode material being deposited in a heterogeneous columnar crystalline skeleton residue in the trenches and at least partly filling them to define a microporous geometrically complementary structure of the supporting heterogeneous columnar crystalline skeleton residue.

17. An integrated semiconductor device according to claim 16, wherein said first and second substrates each comprises monocrystalline silicon.

18. An integrated semiconductor device according to claim 17, further comprising a fuel gas reservoir connected to said first reservoir for providing the first gas.

19. An integrated semiconductor device according to claim 18, wherein said fuel gas reservoir comprises a bottle containing the first gas, the first gas comprising pressurized hydrogen.

20. An integrated semiconductor device according to claim 16, wherein said positive electrode comprises a microporous catalytic electrode that is permeable to the first gas; and wherein said negative electrode comprises a microporous catalytic electrode that is permeable to the second gas and to the products of the reaction between said first and second electrodes.

21. An integrated semiconductor device according to claim 16, wherein the first gas comprises a fuel gas; and wherein the second gas comprises oxygen.

22. An integrated semiconductor device according to claim 16, wherein the plurality of trenches are parallel trenches.

23. An integrated semiconductor device according to claim 16, wherein said exchange membrane comprises a cation exchange membrane.

24. An integrated semiconductor device according to claim 16, wherein said strips of solid metal comprises at least one of gold, platinum, iridium, rhodium and alloys of at least one thereof.

25. An integrated semiconductor device according to claim 16, wherein said plurality of porous metal strips comprises at least one of platinum, palladium iridium, rhodium, ruthenium and alloys thereof.

26. An integrated semiconductor device according to claim 16, wherein said porous heterogeneous columnar crystalline skeleton residue comprises at least one of a p+ and n+ doping.

27. An integrated semiconductor device according to claim 16, further comprising a gas reservoir connected to said second reservoir for providing the second gas.

28. An integrated semiconductor device according to claim 27, wherein said gas reservoir comprises a bottle containing the second gas, the second gas comprising pressurized methanol and water.

* * * * *

UNITED STATES PATENT AND TRADEMARK OFFICE
CERTIFICATE OF CORRECTION

PATENT NO.       : 6,969,664 B2
APPLICATION NO.  : 10/147353
DATED            : November 29, 2005
INVENTOR(S)      : D'Arrigo et al.

It is certified that error appears in the above-identified patent and that said Letters Patent is hereby corrected as shown below:

On The Title Page, as shown on attached Page
Drawing    Delete: FIG. 1
           Insert: New FIG. 1

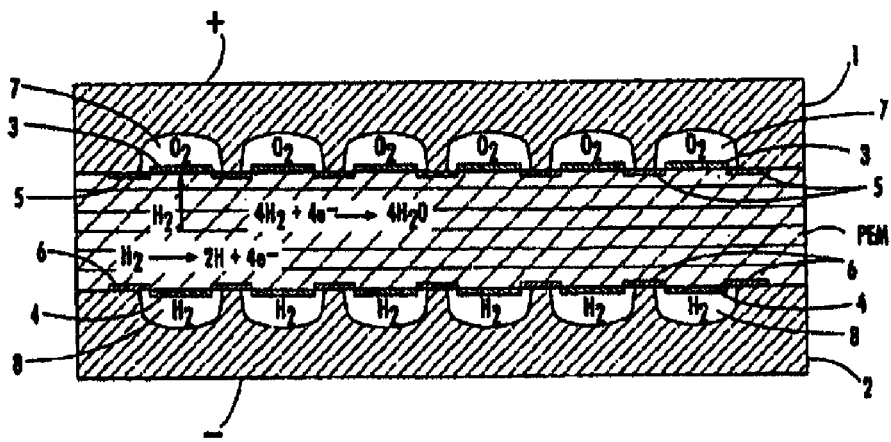

(12) United States Patent
D'Arrigo et al.

(10) Patent No.: US 6,969,664 B2
(45) Date of Patent: Nov. 29, 2005

(54) MICRO SILICON FUEL CELL, METHOD OF FABRICATION AND SELF-POWERED SEMICONDUCTOR DEVICE INTEGRATING A MICRO FUEL CELL

(75) Inventors: Giuseppe D'Arrigo, Tremestieri Etneo (IT); Salvatore Coffa, Tremestieri Etneo (IT); Rosario Corrado Spinella, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 411 days.

(21) Appl. No.: 10/147,353

(22) Filed: May 16, 2002

(65) Prior Publication Data
US 2003/0003347 A1 Jan. 2, 2003

(30) Foreign Application Priority Data
May 17, 2001 (EP) .................. 01830314

(51) Int. Cl.⁷ .................. H01L 21/76; H01M 4/86
(52) U.S. Cl. .................. 438/424; 429/44; 429/41; 429/40
(58) Field of Search .................. 438/19, 424–426, 438/431; 429/40–41, 44

(56) References Cited

U.S. PATENT DOCUMENTS

| | | | |
|---|---|---|---|
| 5,316,869 A * | 5/1994 | Perry et al. | 429/19 |
| 6,506,513 B1 * | 1/2003 | Yonetsu et al. | 429/34 |
| 6,541,149 B1 * | 4/2003 | Maynard et al. | 429/40 |

(Continued)

FOREIGN PATENT DOCUMENTS

| | | | |
|---|---|---|---|
| DE | 19757320 | 7/1999 | H01M 4/92 |
| DE | 19914681 | 10/2000 | H01M 8/02 |
| WO | 0045457 | 8/2000 | H01M 8/10 |
| WO | 0069007 | 11/2000 | H01M 4/86 |

OTHER PUBLICATIONS

Patent Abstracts of Japan, vol. 1995, No. 11, Dec. 26, 1995 & JP 07201348A Aug. 4, 1995.

Kelley et al., A Miniature Methanol/Air Polymer Electrolyte Fuel Cell, Electrochemical and Solid-State Letters, IEEE Service Center, Piscataway, NJ, vol. 3, No. 9, Sep. 2000, pp. 407-409.

Sim et al., Fabrication of Micro Power Source (MPS) Using a Micro Direct Methanol Fuel Cell (MicronDMFC) for the Medical Application, Technical Digest, Mems 2001, 14th IEEE International Conference on Micro Electro Mechanical Systems, Interlaken, CH, Jan. 21-25, 2001, pp. 341-344.

*Primary Examiner*—Jennifer Kennedy
(74) *Attorney, Agent, or Firm*—Lisa K. Jorgenson; Allen, Dyer, Doppelt, Milbrath & Gilchrist, P.A.

(57) ABSTRACT

A fuel cell for an electrical load circuit includes a first monocrystalline silicon substrate and a positive half-cell formed therein, and a second monocrystalline silicon substrate and a positive half-cell formed therein. Each half-cell includes a microporous catalytic electrode permeable to a gas and connectable to the electrical load circuit. A cell area is defined on a surface of each respective monocrystalline silicon substrate, and includes a plurality of parallel trenches formed therein for receiving the gas to be fed to the respective microporous catalytic electrode. A cation exchange membrane separates the two microporous catalytic electrodes. Each half-cell includes a passageway for feeding the respective gas to the corresponding microporous catalytic electrode.

28 Claims, 9 Drawing Sheets

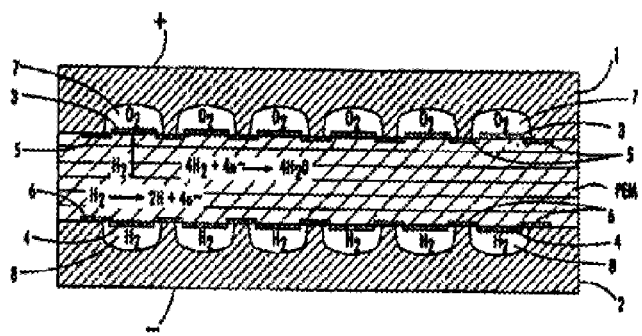

UNITED STATES PATENT AND TRADEMARK OFFICE
CERTIFICATE OF CORRECTION

PATENT NO.       : 6,969,664 B2
APPLICATION NO.  : 10/147353
DATED            : November 29, 2005
INVENTOR(S)      : D'Arrigo et al.

It is certified that error appears in the above-identified patent and that said Letters Patent is hereby corrected as shown below:

In the Drawings:   Delete: FIG. 1
                   Insert: New FIG. 1

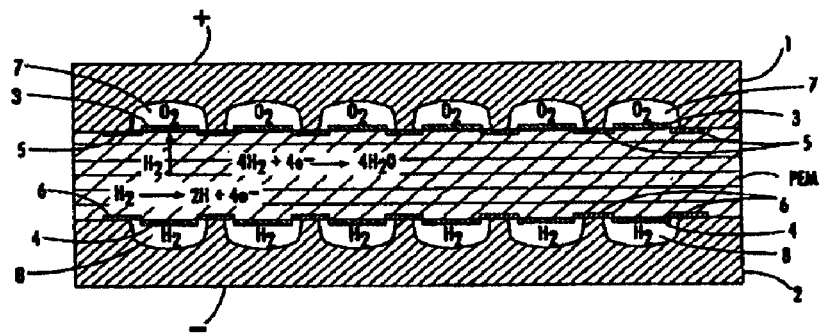

FIG. 1.

UNITED STATES PATENT AND TRADEMARK OFFICE
CERTIFICATE OF CORRECTION

PATENT NO. : 6,969,664 B2
APPLICATION NO. : 10/147353
DATED : November 29, 2005
INVENTOR(S) : D'Arrigo et al.

It is certified that error appears in the above-identified patent and that said Letters Patent is hereby corrected as shown below:

In the Drawings:   Delete: FIGS. 2 - 5
Insert: New FIGS. 2 - 5

Figure 2:
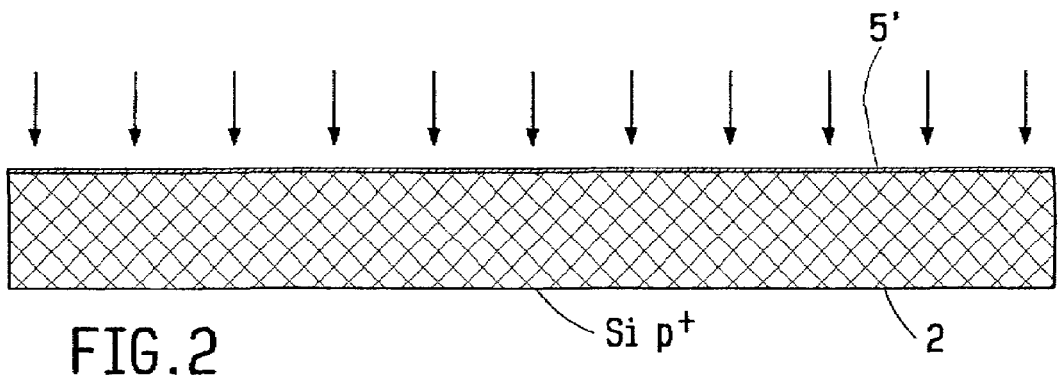
FIGS. 2 to 8 show relevant process steps for fabricating each half-cell according to the present invention.

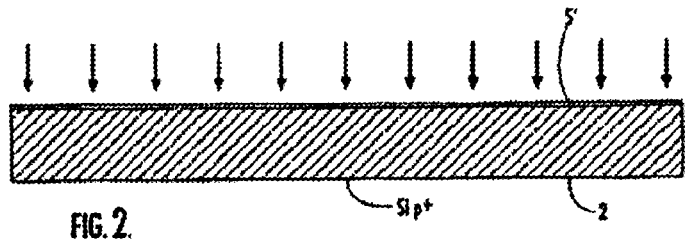
FIG. 2.

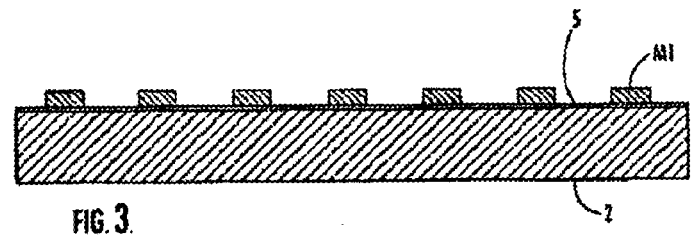
FIG. 3.

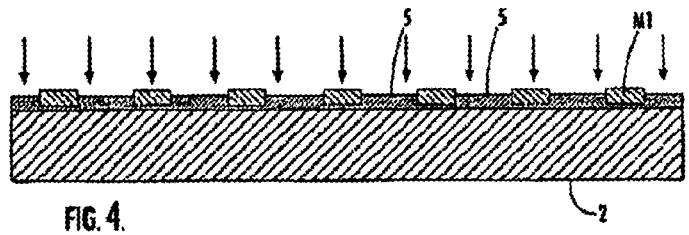
FIG. 4.

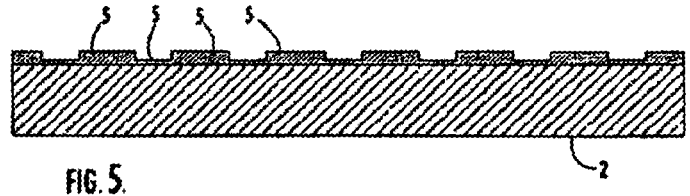
FIG. 5.

UNITED STATES PATENT AND TRADEMARK OFFICE
CERTIFICATE OF CORRECTION

PATENT NO.       : 6,969,664 B2
APPLICATION NO.  : 10/147353
DATED            : November 29, 2005
INVENTOR(S)      : D'Arrigo et al.

Figure 8:
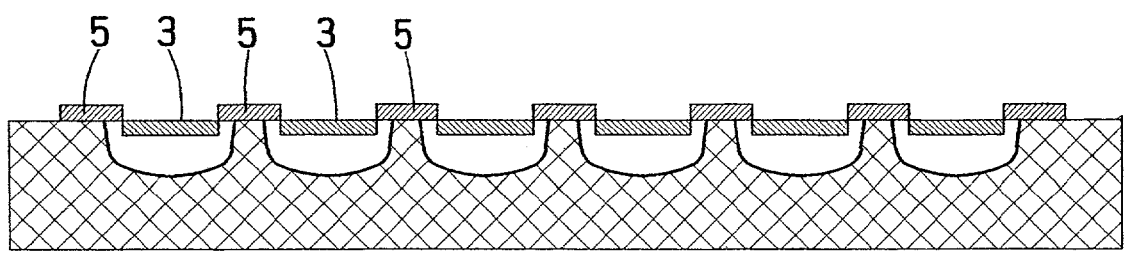

It is certified that error appears in the above-identified patent and that said Letters Patent is hereby corrected as shown below:

In the Drawings:    Delete: FIGS. 6-8
Insert: New FIGS. 6-8

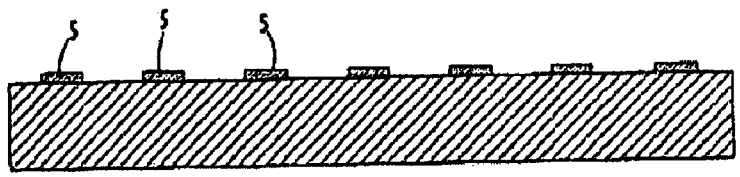

FIG. 6.

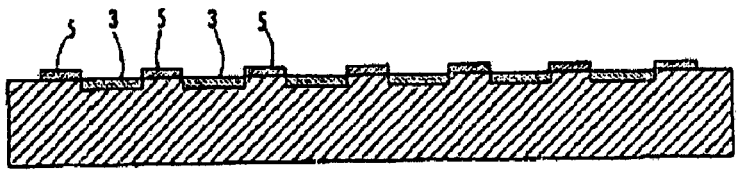

FIG. 7.

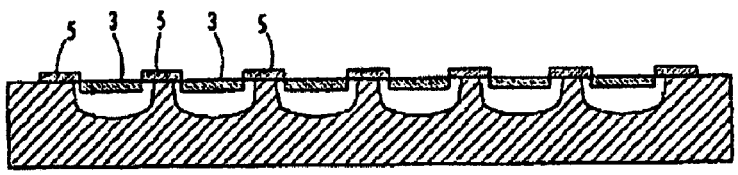

FIG. 8.

UNITED STATES PATENT AND TRADEMARK OFFICE
CERTIFICATE OF CORRECTION

PATENT NO. : 6,969,664 B2
APPLICATION NO. : 10/147353
DATED : November 29, 2005
INVENTOR(S) : D'Arrigo et al.

It is certified that error appears in the above-identified patent and that said Letters Patent is hereby corrected as shown below:

In the Drawings:    Delete: FIG. 9
Insert: New FIG. 9

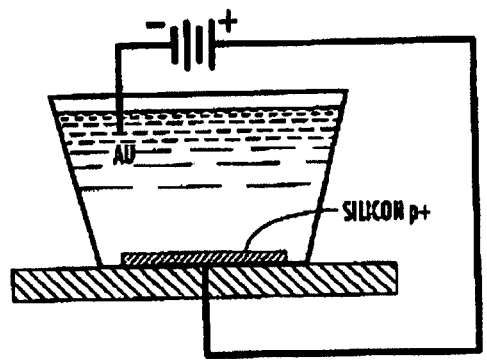

FIG. 9.

UNITED STATES PATENT AND TRADEMARK OFFICE
CERTIFICATE OF CORRECTION

PATENT NO.       : 6,969,664 B2                                          Page 7 of 13
APPLICATION NO.  : 10/147353
DATED            : November 29, 2005
INVENTOR(S)      : D'Arrigo et al.

It is certified that error appears in the above-identified patent and that said Letters Patent is hereby corrected as shown below:

In the Drawings:        Delete: FIG. 10
                        Insert: New FIG. 10

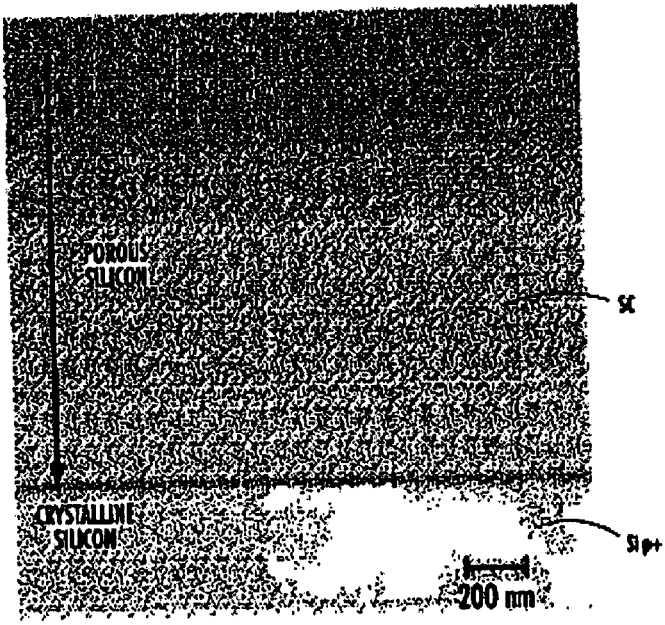

FIG. 10.

UNITED STATES PATENT AND TRADEMARK OFFICE
CERTIFICATE OF CORRECTION

PATENT NO. : 6,969,664 B2
APPLICATION NO. : 10/147353
DATED : November 29, 2005
INVENTOR(S) : D'Arrigo et al.

Figure 11:
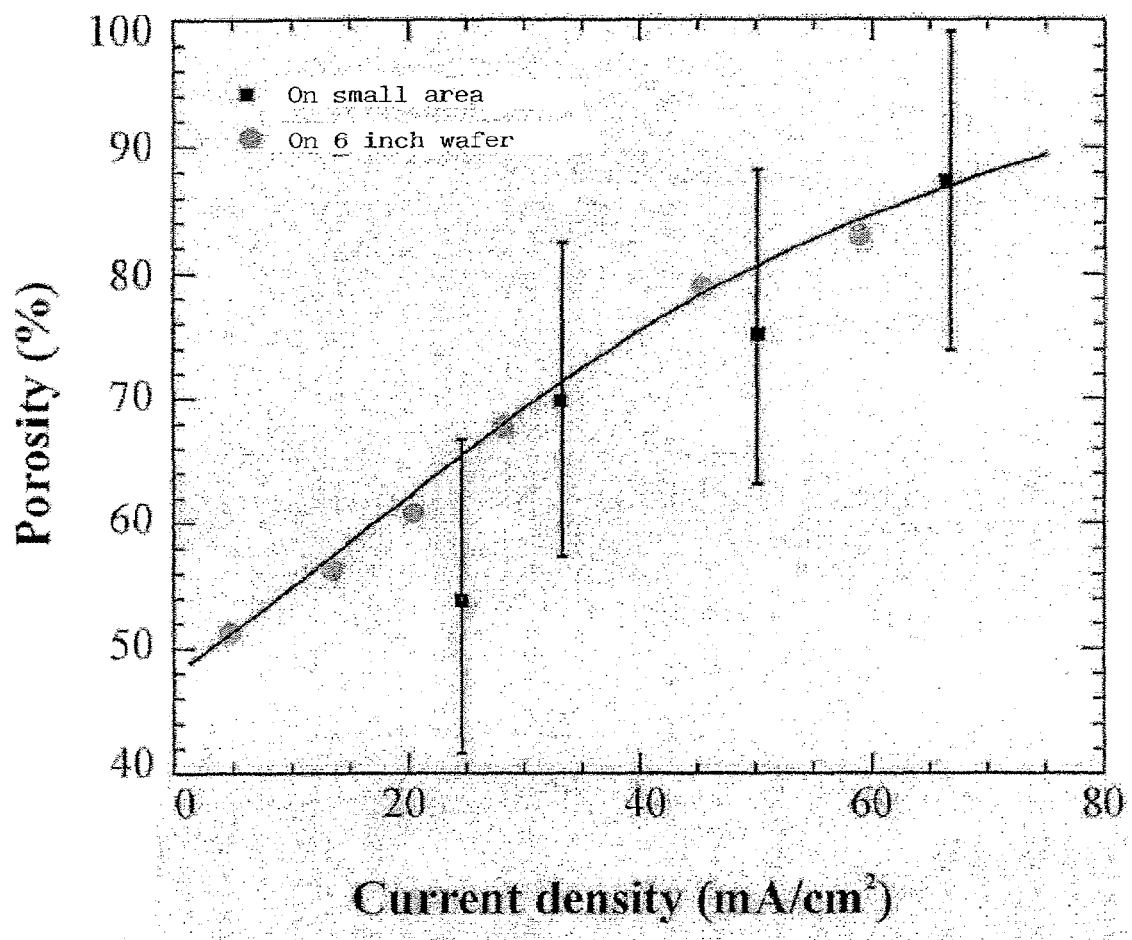
FIG. 11 is a curve showing the modulability of the porosity by regulating the current density of electrochemical etching of the silicon according to the present invention.

It is certified that error appears in the above-identified patent and that said Letters Patent is hereby corrected as shown below:

In the Drawings:    Delete: FIG. 11
Insert: New FIG. 11

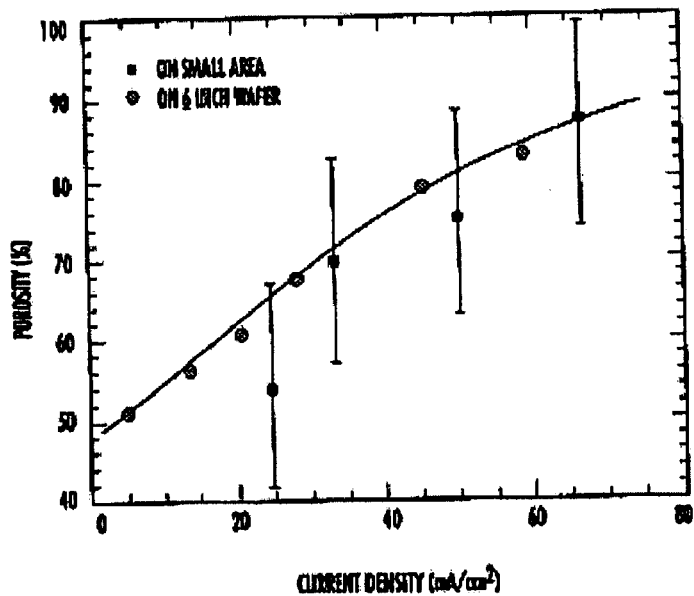

UNITED STATES PATENT AND TRADEMARK OFFICE
CERTIFICATE OF CORRECTION

PATENT NO. : 6,969,664 B2
APPLICATION NO. : 10/147353
DATED : November 29, 2005
INVENTOR(S) : D'Arrigo et al.

It is certified that error appears in the above-identified patent and that said Letters Patent is hereby corrected as shown below:

In the Drawings: Delete: FIG. 12
Insert: New FIG. 12

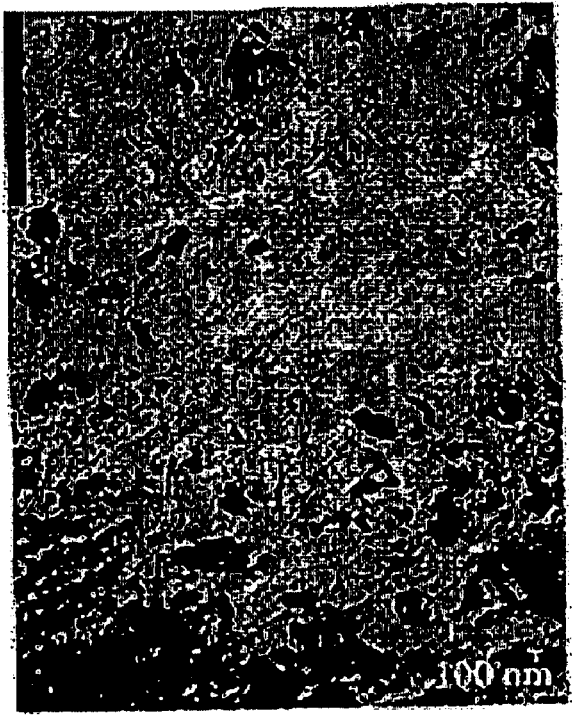

FIG. 12.

UNITED STATES PATENT AND TRADEMARK OFFICE
CERTIFICATE OF CORRECTION

| | | |
|---|---|---|
| PATENT NO. | : 6,969,664 B2 | |
| APPLICATION NO. | : 10/147353 | |
| DATED | : November 29, 2005 | |
| INVENTOR(S) | : D'Arrigo et al. | |

It is certified that error appears in the above-identified patent and that said Letters Patent is hereby corrected as shown below:

In the Drawings:    Delete: FIG. 13
Insert: New FIG. 13

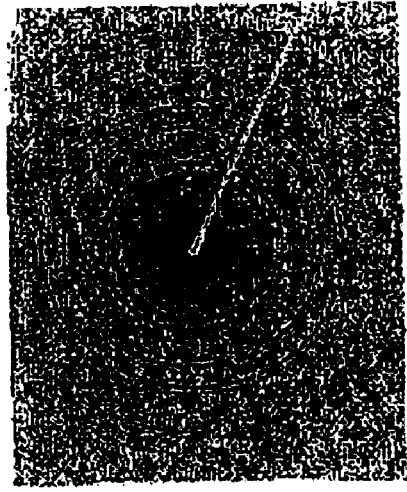

FIG. 13.

UNITED STATES PATENT AND TRADEMARK OFFICE
CERTIFICATE OF CORRECTION

PATENT NO. : 6,969,664 B2 Page 11 of 13
APPLICATION NO. : 10/147353
DATED : November 29, 2005
INVENTOR(S) : D'Arrigo et al.

It is certified that error appears in the above-identified patent and that said Letters Patent is hereby corrected as shown below:

In the Drawings:   Delete: FIG. 14
Insert: New FIG. 14

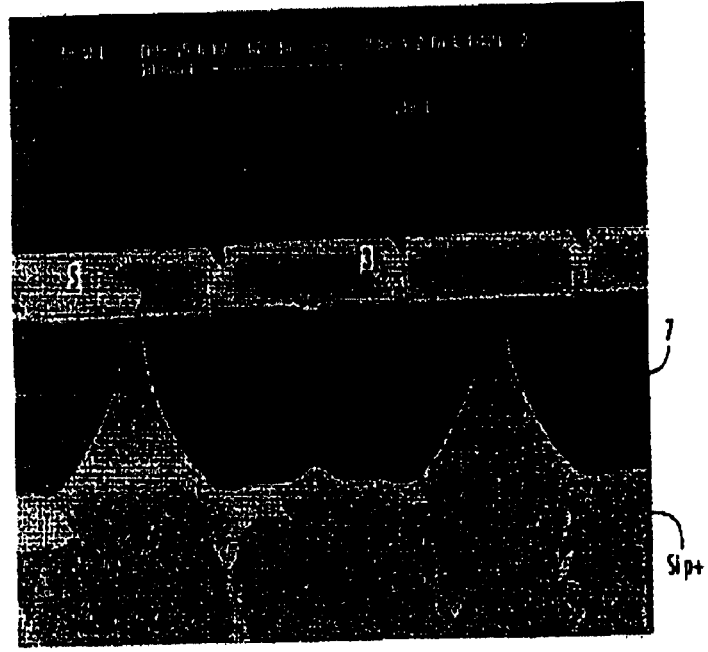

FIG. 14.

UNITED STATES PATENT AND TRADEMARK OFFICE
CERTIFICATE OF CORRECTION

PATENT NO.        : 6,969,664 B2
APPLICATION NO.   : 10/147353
DATED             : November 29, 2005
INVENTOR(S)       : D'Arrigo et al.

Figure 16:
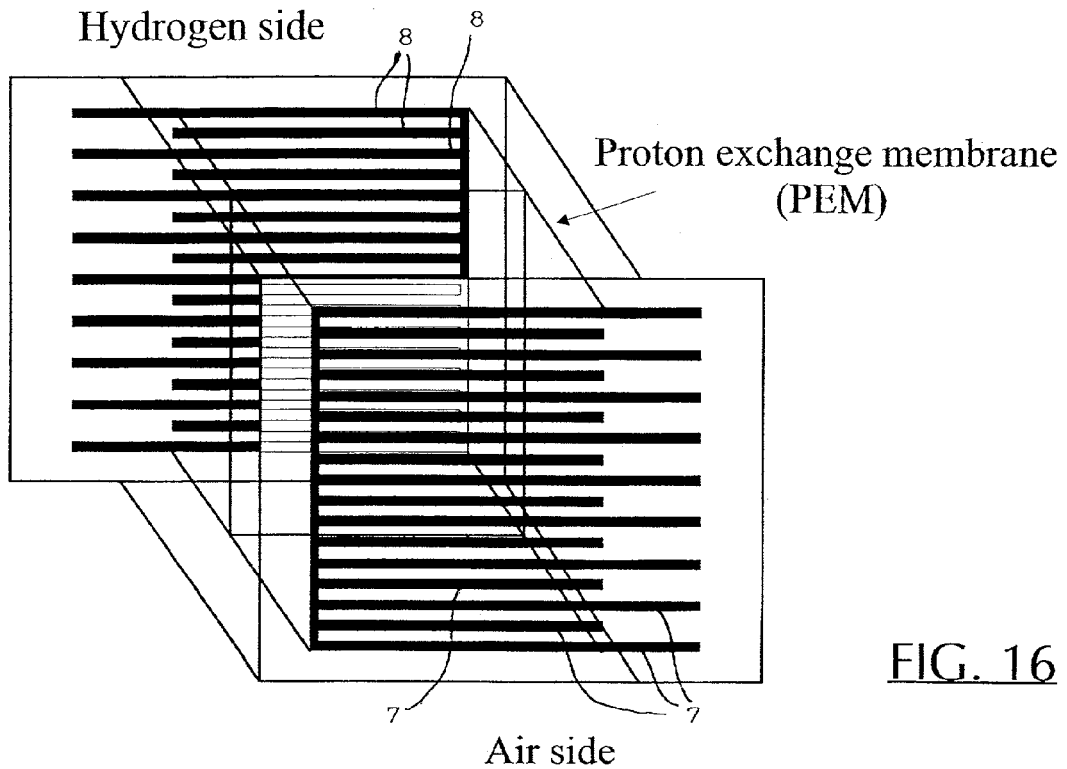
FIGS. 15 and 16 are respectively a cross section and an exploded detailed view of a micro fuel cell according to the present invention.

It is certified that error appears in the above-identified patent and that said Letters Patent is hereby corrected as shown below:

In the Drawings:    Delete: FIGS. 15-16
                    Insert: New FIGS. 15-16

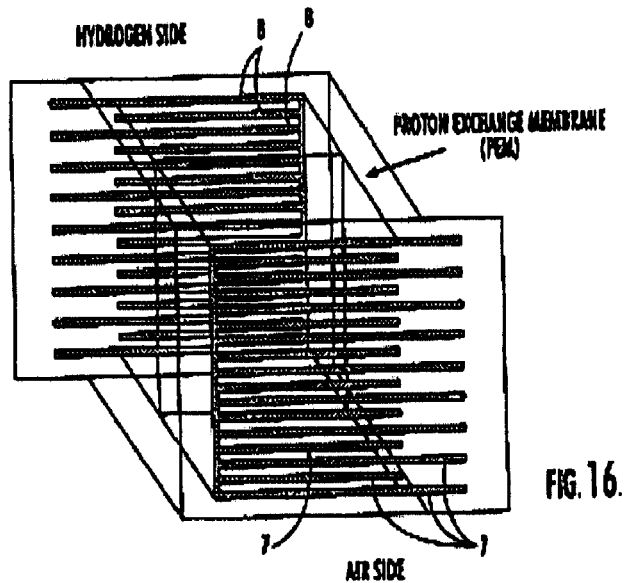

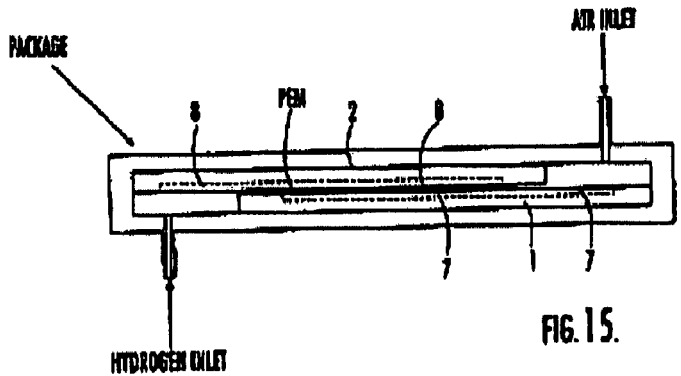

UNITED STATES PATENT AND TRADEMARK OFFICE
CERTIFICATE OF CORRECTION

PATENT NO. : 6,969,664 B2
APPLICATION NO. : 10/147353
DATED : November 29, 2005
INVENTOR(S) : D'Arrigo et al.

It is certified that error appears in the above-identified patent and that said Letters Patent is hereby corrected as shown below:

| | |
|---|---|
| Column 3, Line 32 | Delete: "optionally"<br>Insert: -- optional -- |
| Column 4, Line 18 | Delete: "is" |
| Column 9, Line 16 | Delete: "a a plurality"<br>Insert: -- a plurality -- |
| Column 10, Line 24 | Delete: "a" |
| Column 11, Line 13 | Delete: "palladium"<br>Insert: -- palladium, -- |

Signed and Sealed this

Fourth Day of March, 2008

JON W. DUDAS
*Director of the United States Patent and Trademark Office*